United States Patent
Dziuba et al.

(10) Patent No.: US 10,628,796 B2
(45) Date of Patent: Apr. 21, 2020

(54) SYSTEMS AND PROCESSES OF IMPORTING AND COMPARING BENEFIT OPTIONS

(71) Applicant: ADP, LLC, Roseland, NJ (US)

(72) Inventors: Benjamin J. Dziuba, New York, NY (US); Jesse S. Zolna, Larchmont, NY (US)

(73) Assignee: ADP, LLC, Roseland, NJ (US)

( * ) Notice: Subject to any disclaimer, the term of this patent is extended or adjusted under 35 U.S.C. 154(b) by 912 days.

(21) Appl. No.: 14/531,491

(22) Filed: Nov. 3, 2014

(65) Prior Publication Data
US 2016/0125362 A1 May 5, 2016

(51) Int. Cl.
*G06Q 10/10* (2012.01)

(52) U.S. Cl.
CPC ......... *G06Q 10/1057* (2013.01); *G06Q 10/10* (2013.01)

(58) Field of Classification Search
CPC ..... G06Q 50/22; G06Q 10/1057; G06Q 10/10
See application file for complete search history.

(56) References Cited

U.S. PATENT DOCUMENTS

| | | | |
|---|---|---|---|
| 7,912,739 B2 | 3/2011 | Colley et al. | |
| 8,442,847 B1* | 5/2013 | Shrivastava | G06Q 40/08 705/35 |
| 2006/0248008 A1 | 11/2006 | Lind | |
| 2013/0041835 A1 | 2/2013 | Thompson et al. | |
| 2013/0090948 A1* | 4/2013 | Upadhyayula | G06Q 50/22 705/3 |
| 2013/0132106 A1* | 5/2013 | Perry | G06Q 10/10 705/2 |
| 2014/0006059 A1 | 1/2014 | Rosen et al. | |
| 2014/0114674 A1 | 4/2014 | Krughoff et al. | |
| 2014/0142989 A1 | 5/2014 | Grosso | |
| 2015/0302498 A1* | 10/2015 | Barton | G06Q 30/0611 705/26.4 |

OTHER PUBLICATIONS

Unknown, "Which Plan is Right for Me?", MVP Health Care, https://www.mywealthcareonline.com/mvphealthcare/Resources/HSAResources/WhichHSAPlanisRightforme.aspx, 2012, one page.
Krughoff et al., "Helping Consumers Choose Health Plans in Exchanges: Best Practice Recommendations", HealthAffairs GrantWatch Blog, Feb. 29, 2012, six pages.

* cited by examiner

*Primary Examiner* — Robert A Sorey
*Assistant Examiner* — Kristine K Rapillo
(74) *Attorney, Agent, or Firm* — Andrew M. Calderon; Roberts Calderon Safran & Cole, P.C.

(57) ABSTRACT

Systems and processes of comparing medical benefit options obtained from different, external sources are disclosed. The processes include a method of comparing plan benefits implemented in a computing system. The method includes: obtaining plan information associated with different plans from different external sources and which are related to pre-defined categories; normalizing the plan information into a common form for each of the pre-defined categories; and generating a visual display of a plurality of selectable and dynamically changeable areas each of which is associated with a pre-defined category of a different plan and which is populated with the normalized imported plan information in a standard format in a side-by-side manner.

23 Claims, 10 Drawing Sheets

Medical Insurance

COMPARE PLANS | VIEW DETAILS | 24 Days Left to Enroll

COMPARE BY FEATURE

Expected Costs
How The Plan Works — 315
Doctor Visits
Diagnostic Testing
Retail Prescriptions
Doctor Access
Emergency Care
Hospitalization — 316

WHO IS COVERED
- ☐ You
- ☑ Sarah Smith
- ☐ Robert Robertson
- ☑ Aimee Smith

○ I don't want this benefit

---

Medical Insurance Plan #1 — 305a

Expected Costs
Contribution Per Pay Period
$XXX — 312

Estimated Yearly Costs ●
The least you'll pay   $2700
Based on typical use  $6700
The most you'll pay  $10000

VIEW FULL PLAN DETAILS >

At-A-Glance
Lowest premiums
Employer funded HSA ●
High Annual Deductible ( Enroll in this Plan )

---

Medical Insurance Plan #2 — 305b

Expected Costs
Contribution Per Pay Period
$XXX

Estimated Yearly Costs ●
The least you'll pay   $3700
Based on typical use  $9700
The most you'll pay  $11500

VIEW FULL PLAN DETAILS >

At-A-Glance
Annual deductible
Copays for most services
Must stay in network for care ( Enroll in this Plan )

---

Medical Insurance Plan #3 — 305c

Expected Costs
Contribution Per Pay Period
$XXX

Estimated Yearly Costs ●
The least you'll pay   $4700
Based on typical use  $7700
The most you'll pay  $12000

VIEW FULL PLAN DETAILS >

At-A-Glance
Copays for most services
Low copay for prescriptions
Reduced out-of-network ( Enroll in this Plan )

FIG. 6

Estimate your yearly cost

Annual Enrollment

700

Estimate your cost for each available plan based on possible usage. Select a service to adjust the numbers for each covered person, or load "what if" scenarios o see how different usages affect yearly costs

| Sample Scenario | Doctor's Visit | Brand Rx | Generic Rx | Minor Surgeries | Hospital Stays | Imaging |
|---|---|---|---|---|---|---|
| John S. (you) "What if" | 1 | 0 | 0 | 0 | 0 | 0 |
| David S. "What if" | 3 | 1 | 1 | 0 | 0 | 1 |
| Mikey S. "What if" | 4 | 0 | 1 | 1 | 0 | 0 |

705a / 705

Medical Plan #1  + [====|      ] MAX.  $ XXX /YR  Enroll — 715
CONTRIBUTION OUT OF POCKET (family)  710

Medical Plan #2  + [========|  ] MAX.  $ XXX /YR  Enroll
CONTRIBUTION OUT OF POCKET (family)

Medical Plan #3  + [           ] MAX.  $ XXX /YR  Enroll
CONTRIBUTION OUT OF POCKET (family)

FIG. 7

Estimate your yearly cost

Annual Enrollment
700

Estimate your cost for each available plan based on possible usage. Select a service to adjust the numbers for each covered person, or load "what if" scenarios o see how different usages affect yearly costs.

| Sample Scenario | Doctor's Visit | Brand Rx | Generic Rx | Minor Surgeries | Hosp.Stays | Imaging |
|---|---|---|---|---|---|---|
| John S. (you) "What if" | 4 | 0 | 0 | 0 | 0 | 0 |
| David S. "What if" | 3 | 1 | 1 | 0 | 0 | 1 |
| Michael S. "What if" | 0 | 0 | 1 | 1 | 0 | 0 |

Medical Plan #1  + CONTRIBUTION  OUT OF POCKET (family)  MAX.  $ XXX /YR  Enroll Medical Plan #2  + CONTRIBUTION  OUT OF POCKET (family)  MAX.  $ XXX /YR  Enroll Medical Plan #3  + CONTRIBUTION  OUT OF POCKET (family)  MAX.  $ XXX /YR  Enroll

FIG. 8

SYSTEMS AND PROCESSES OF IMPORTING AND COMPARING BENEFIT OPTIONS

TECHNICAL FIELD

The invention relates to systems and processes of importing and comparing benefit options and, more particularly, to systems and processes of comparing medical benefit options obtained from different, external sources.

BACKGROUND

The cost and types of benefits and/or coverage associated with medical insurance plans are important factors in selecting certain medical insurance plans. That is, costs and benefits and/or coverage can have a major impact on the decision to purchase certain types of medical insurance plans, from basic medical insurance coverage to coverage with a host of more advanced options. In fact, in many instances consumer costs are a driving factor in selecting certain medical insurance plans.

Typically, an employer offers several medical insurance plans to their employees. These medical insurance plans come with different costs and different coverage. For example, one medical insurance plan can have a high deductible with a low premium; whereas, another medical insurance plan may have a low deductible with a high premium. These different plans can also include different co-payments and costs for different prescription drug plans. To complicate the selection process even more, the employer can offer certain benefits to their employees, ranging from health savings accounts (HSA) to premium support.

Another complicating factor to select a medical insurance plan is that an employee (or individual) can select medical insurance plans from different sources, other than the employer: a spouse's employer or a government run insurance exchange, as examples. Each of these different sources can include different types of information, located at different sources, spread among different documents, thus making it very difficult for the consumer to compare and select between the medical insurance plans. With these many factors to consider, it becomes ever more difficult for a consumer to compare and select an appropriate medical insurance plan.

SUMMARY OF THE INVENTION

In a first aspect of the invention, a method of comparing plan benefits implemented in a computing system comprises: obtaining plan information associated with different plans from different external sources and which are related to pre-defined categories; normalizing the plan information into a common form for each of the pre-defined categories; and generating a visual display of a plurality of selectable and dynamically changeable areas each of which is associated with a pre-defined category of a different plan and which is populated with the normalized imported plan information in a standard format in a side-by-side manner.

In a further aspect of the invention, a computer system for generating a comparison benefit user interface (UI) comprises a hardware memory device that stores program instructions and a hardware processor that executes the program instructions. The hardware processor causes the computer system to: obtain plan information of different plan options from different external sources; map the obtained plan information into pre-defined categories each of which is associated with the different plan options; place the plan information associated with each of the pre-defined categories into a common form; generate a visual display comprising a side by side plurality of selectable and changeable areas each having regions which are operable to contain like kind information provided in the common form; and populate each of the regions of each viewable plurality of selectable and changeable areas with same plan information in the common form in response to a user selected category.

In a further aspect of the invention, a computer program product comprises computer readable program instructions stored on computer readable storage medium. The computer readable program instructions causes a computing device to: import plan information of different plan options from different external sources, into a single computing system; normalize the imported plan information into same type formats in each of a plurality of predefined categories; generate a visual display comprising a plurality of selectable and changeable areas, each of which have dynamically changeable regions which are populated with the normalized imported plan information in a standard format for selected predefined categories of the plurality of predefined categories; and regenerate any of the viewable plurality of selectable and changeable areas or regions thereof, each of which are populated with the normalized imported plan information in the standard format based on a user selected predefined category.

BRIEF DESCRIPTION OF THE DRAWINGS

The present invention is described in the detailed description which follows, in reference to the noted plurality of drawings by way of non-limiting examples of exemplary embodiments of the present invention.

FIGS. 3-8 show exemplary user interfaces and underlying functionality in accordance with aspects of the invention.

DETAILED DESCRIPTION OF ASPECTS OF THE INVENTION

Figure 1:
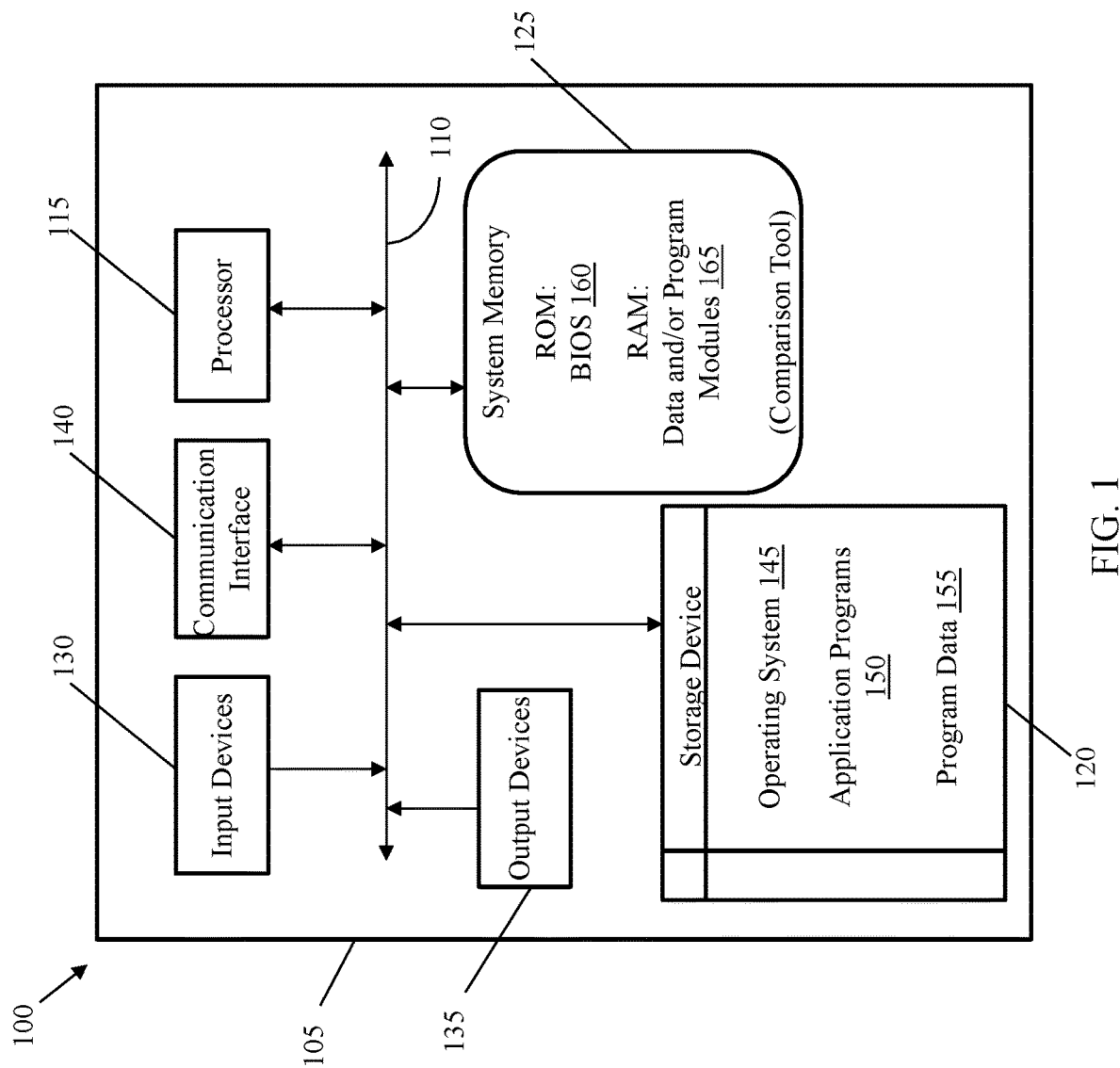
FIG. 1 is an illustrative architecture of a computing system implemented as embodiments of the present invention.

The invention relates to systems and processes of importing and comparing benefit options and, more particularly, to systems and processes of comparing medical benefit options obtained from different external sources. More specifically, the present invention relates to systems and processes of importing information related to different medical insurance plans, from different internal and external sources, and collating this information into an easily readable and standardized format for consumer comparison. The internal and external sources can comprise, for example, medical plans of an employer, a spouse's employer, state and federal medical exchanges, etc. In particular, the information obtained from external and internal sources can be collated and presented to a consumer for comparison of costs and benefits of different medical insurance plans offered by different sources, e.g., employer, government run exchanges or other public options, etc.

In embodiments, the systems and processes of the present invention provide the technical solution of gathering information about different medical insurance plans, from different, internal and external sources. This information can be obtained by "scraping" different databases and/or websites, e.g., websites of one or more insurance companies, government run exchange, etc. In alternate or additional embodiments, this information can be obtained directly from the third party supplier of insurance, e.g., insurance company or a government exchange, employer, or other public option, etc., using exposed APIs which can be pulled into a single source for collating into a standardized format for subsequent comparison by the consumer. For example, the systems and processes of the present invention can obtain medical insurance plans using JavaScript Object Notation (JSON). As one of skill in the art should understand, JSON is a lightweight data-interchange format, which is based on a subset of the JavaScript Programming Language. JSON is a text format that is language independent, which uses conventions that are familiar C-family of languages, including C, C++, C#, Java, JavaScript, Perl, Python, and many others.

In embodiments, the information of different medical insurance plans can be imported from many different databases, into a centralized database which is created, maintained, supported, etc., by a single service provider or multiple service providers. In additional embodiments, the information can be obtained from different databases which are maintained by a single service provider. For example, a service provider may already have information related to different medical insurance plans, based on existing relationships or coverage offered by their clients and managed by the service provider. This information from, e.g., a single service provider, can then be used for comparison purposes, by a consumer.

In any of the different scenarios, information about medical insurance plans imported and/or obtained by the systems and processes of the present invention can include, amongst other things:

(i) Different types of medical coverage, e.g., how the plan works, doctor visits, diagnostic testing, doctor access, emergency care, hospitalization, etc.; and/or (ii) Costs associated with different benefits of different medical insurance plans, e.g., doctor visit copay/costs for employee (general, specialist), prescription copay/cost for employee, emergency care costs for employee and/or other out-of-pocket contribution costs of medical insurance for different medical insurance plans using different scenarios.

In additional embodiments, the systems and processes of the present invention provide the technical solution of allowing the consumer to fine tune or adjust cost estimates of the different medical insurance plans by adjusting values of different scenarios associated with the medical insurance plans. In this way, the systems and processes of the present invention allow a consumer to compare out-of-pocket contribution costs for different insurance plans (e.g., medical insurance plans) using different scenarios. For example, the systems and processes of the present invention allow a consumer to select possible future events in order to calculate more accurately estimate medical expenses associated with unique situations under various aspects of different medical plans obtained from different sources. In this way, the consumer is provided an opportunity to make an educated decision with regard to comparison costs and benefits of different medical insurance plans based on unique situations relevant to the requesting consumer and, hence select appropriate medical insurance coverage.

FIG. 1 is an illustrative architecture of a computing system 100 implemented as embodiments of the present invention. The computing system 100 is only one example of a suitable computing system and is not intended to suggest any limitation as to the scope of use or functionality of the invention. Also, computing system 100 should not be interpreted as having any dependency or requirement relating to any one or combination of components illustrated in computing system 100.

As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors, microprocessors, or specialized dedicated processors that include processing circuitry operative to interpret and execute computer readable program instructions, such as program instructions for controlling the operation and performance of one or more of the various other components of computing device 105 for implementing the functionality, steps, and/or performance of the present invention.

In embodiments, processor 115 interprets and executes the processes, steps, functions, and/or operations of the present invention, which may be operatively implemented by the computer readable program instructions. For example, processor 115 can retrieve, e.g., import and/or otherwise obtain, information about different medical insurance plans from different external sources, and provide this information to the consumer in a standardized format for consumer comparison of different medical insurance plans.

In embodiments, the information about the different medical plans can be obtained by many different methods, any of which are contemplated by the present invention. For example, the processor 115, e.g., comparison tool of the present invention, can "scrape" websites or other databases for pertinent information. This can include, for example, web scraping or other known data mining techniques to obtain information associated with an insurance plan from different databases and/or websites. As a further alternative or additional embodiment, the processor 115, e.g., comparison tool, can obtain such information using APIs (provided by the different websites or databases), e.g., JSON. As yet another alternative or additional embodiment, the processor 115, e.g., comparison tool, can obtain such information using login information, e.g., ID and password information for different websites and/or databases. In this latter scenario, as an example, it is possible to obtain such information from different databases maintained, supported, etc. by another service provider.

In embodiments, the information about the different medical insurance plans, obtained from different external sources, can be formatted into a standardized format for ease of comparison. For example, the processor 115, e.g., comparison tool, can standardize the different information so that a side-by-side comparison (e.g., like kind comparison) of selected information of different medical plans obtained from different external sources can be made such as that shown in FIGS. 3-8 described below. By way of example, the information obtained by the systems and processes of the present invention and which can be collated for comparison can include:

(i) Different types of medical coverage, e.g., how the plan works, doctor visits, diagnostic testing, doctor access, emergency care, hospitalization, etc.; and (ii) Price points such as costs associated with different benefits of different medical insurance plans, e.g., doctor visit copay/costs for employee (general, specialist), prescription copay/cost for employee, emergency care costs for employee; and/or other out-of-pocket contribution costs of medical insurance for different medical insurance plans using different scenarios.

Also, information can be provided by the consumer. For example, the present invention allows for manual entry of any data (e.g., information) not automatically retrieved (obtained/imported) by the systems and processes of the present invention. For example, plan expiry dates, plan names, as well as any other benefit and/or cost information which was not obtained by the processes and systems of the present invention, e.g., scraping, data mining, APIs, direct login to databases, websites, etc., can be manually entered by the consumer and/or administrator.

In additional embodiments, the processor 115, e.g., comparison tool, also provides a technological solution to determine whether all necessary information was properly retrieved in order to compare different medical insurance plans. For example, by comparing the imported/obtained information to a look-up table, database or other data reference source of required information, the processor 115, e.g., comparison tool, can determine which information for any of the medical insurance plans from different external sources should be retrieved and, if such information was actually obtained. In embodiments, the processor 115, e.g., comparison tool, can notify the consumer as to which information was not retrieved for a particular medical insurance plan. In embodiments, the processor 115, e.g., comparison tool, can also attempt to find the non-received information from other locations, e.g., websites, directly from insurance companies, other databases which are maintained by a service provider or its clients, etc.

Also, the systems and processes of the present invention can request this information to be manually entered by the consumer or an administrator. Moreover, any additional information for comparison can be manually entered by the consumer or administrator, for comparison to other information obtained by the processes and systems of the present invention or manually entered by the consumer or administrator for comparison of different medical insurance plans.

In addition, the consumer can provide information such that the systems and processes of the present invention can calculate and/or recalculate out-of pocket expenses, in order to determine a more accurate cost estimate, and hence allow the consumer to compare different costs structures for different medical insurance plans thereby allowing the consumer to make an educated selection decision for different medical plans and different individual situations. For example, the processor 115, e.g., comparison tool, provides the consumer the ability to adjust services associated with different medical insurance plans which, in turn, will adjust contribution costs for the consumer. This will allow the consumer to compare medical costs for different scenarios as further described herein. This adjusted information which can be manually entered by the consumer can include, for example, amongst other things:

(i) number of anticipated visits to a doctor's office;
(ii) anticipated surgeries, e.g., number and type;
(iii) number of x-rays and other diagnostics testing;
(iv) different brand and generic prescriptions; and/or
(v) any associated costs and/or out-of-pocket expenses.

In aspects of the present invention, the processor 115, e.g., comparison tool, has access to costs associated with different medical plans in order to make adjustments for out-of-pocket expenses based on the different scenarios provided by the consumer. The different types of expenses can include, for example, any deductibles as well as copayments for doctor's visits, prescription drugs, diagnostic testing, etc.

In embodiments, the information obtained by the processor 115, e.g., comparison tool, can be stored in the storage device 120, associated with the appropriate medical insurance plan. From a technological solution, this information can then be used to make the side-by-side comparisons and fine tune the contribution costs for different insurance plans using different scenarios that are unique to the consumer. In this way, the present invention contemplates that a service provider can obtain access to different information of each medical insurance plan offered, e.g., by an employer, or otherwise available to a consumer.

In embodiments, processor 115 may receive input signals from one or more input devices 130 and/or drive output signals through one or more output devices 135. The input devices 130 may be, for example, a keyboard or touch sensitive user interface (UI) as further described below. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention. In embodiments, storage device 120 may store operating system 145, application programs 150, and program data 155 in accordance with aspects of the present invention.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, program modules application programs 150, and/or program data 155, that are accessible to and/or presently being operated on by processor 115, may be contained in the RAM. In embodiments, the program modules 165 and/or application programs 150 can comprise the comparison tool of the present invention, which provides the instructions for execution of processor 115.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to provide comparisons of different medical insurance plans obtained from different external sources. In particular, computing device 105 may perform tasks (e.g., process, steps, methods and/or functionality) in response to processor 115 executing program instructions contained in computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

Figure 2:
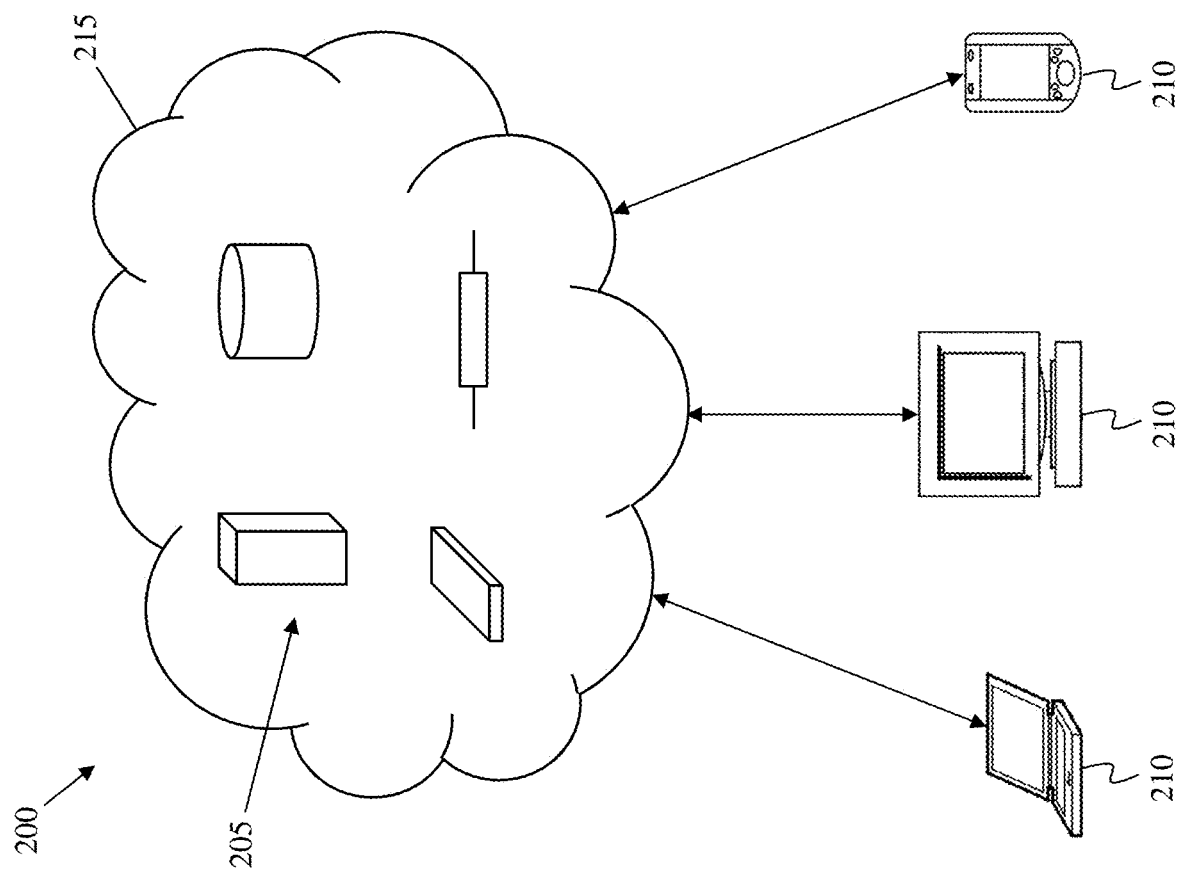
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. In embodiments, client devices 210 can be, for example, a desktop computer, laptop computer or mobile device of an employee. In alternative embodiments, the client devices 210 can be a computing system provided by an employer, which is accessible by an employee; although cloud resources 205 are typically provided and maintained by a service provider so that a client does not need to maintain resources on a local client device 210. In embodiments, cloud resources 205 may includes one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including hardware and software layers, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, consumer portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and processes described herein are not limited to cloud computing and instead can be implemented on any suitable computing environment.

Cloud resources 205 may be configured to provide a variety of functionality that involves consumer interaction. Accordingly, a user interface (UI) can be provided for communicating with cloud resources 205 and/or performing tasks associated with cloud resources 205. The UI can be accessed via the client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device 210 in some embodiments. In other embodiments, a web browser-based portal can be used to provide the UI. Any other configuration to access cloud resources 205 can also be used in various implementations.

FIGS. 3-8 show various user interfaces (UIs) representative and illustrative of functionality in accordance with aspects of the present invention. The various user interfaces (UI) can be provided on the client devices 210 via network 215, as described in FIG. 2. In addition, the underlying functionality shown in the various user interfaces (UIs) provide a technical solution using a back-end system, such as the computing system 100 of FIG. 1, as described herein. For example, the technological solution of any of the underlying calculations, adjustments, standardizations, access to and obtaining of information and interfaces can be provided by computing system 100 of FIG. 1. The data, e.g., information, obtained by the computing system 100 may be retrieved from disparate external sources, with different formats and or different types of information.

In embodiments, the various UIs described with respect to FIGS. 3-8 may be part of a collection of interfaces that make up an overall benefit UI that is generated at least in part by a service provider computing device such as computing system 100 of FIG. 1. Generating the UIs may include: obtaining stored information associated with each one of the plural different medical insurance plans, normalizing the data (information), if necessary, and formatting the obtained information for display in predefined areas of the UIs. The particulars of the UIs shown in FIGS. 3-8 are exemplary and shown for the purpose of illustrating processes and functionality of aspects of the invention, and are not intended to limit the invention.

In some instances, the UIs of FIGS. 3-8 include selectable objects that are adapted for prompting and defining input from a consumer. As used herein, the term "selectable object" refers to a button or hyperlink or similar object that is displayed in a UI that may be selected by the consumer with a user input such as a mouse click or finger tap, and that when selected by the consumer results in a change in the UI. It should be understood by those of skill in the art that the nomenclature used for any of the buttons, icons or descriptive terms herein is provided as an illustrative example, and that other descriptive terms, icons, and/or scroll down windows are contemplated by the present invention.

Figure 3:
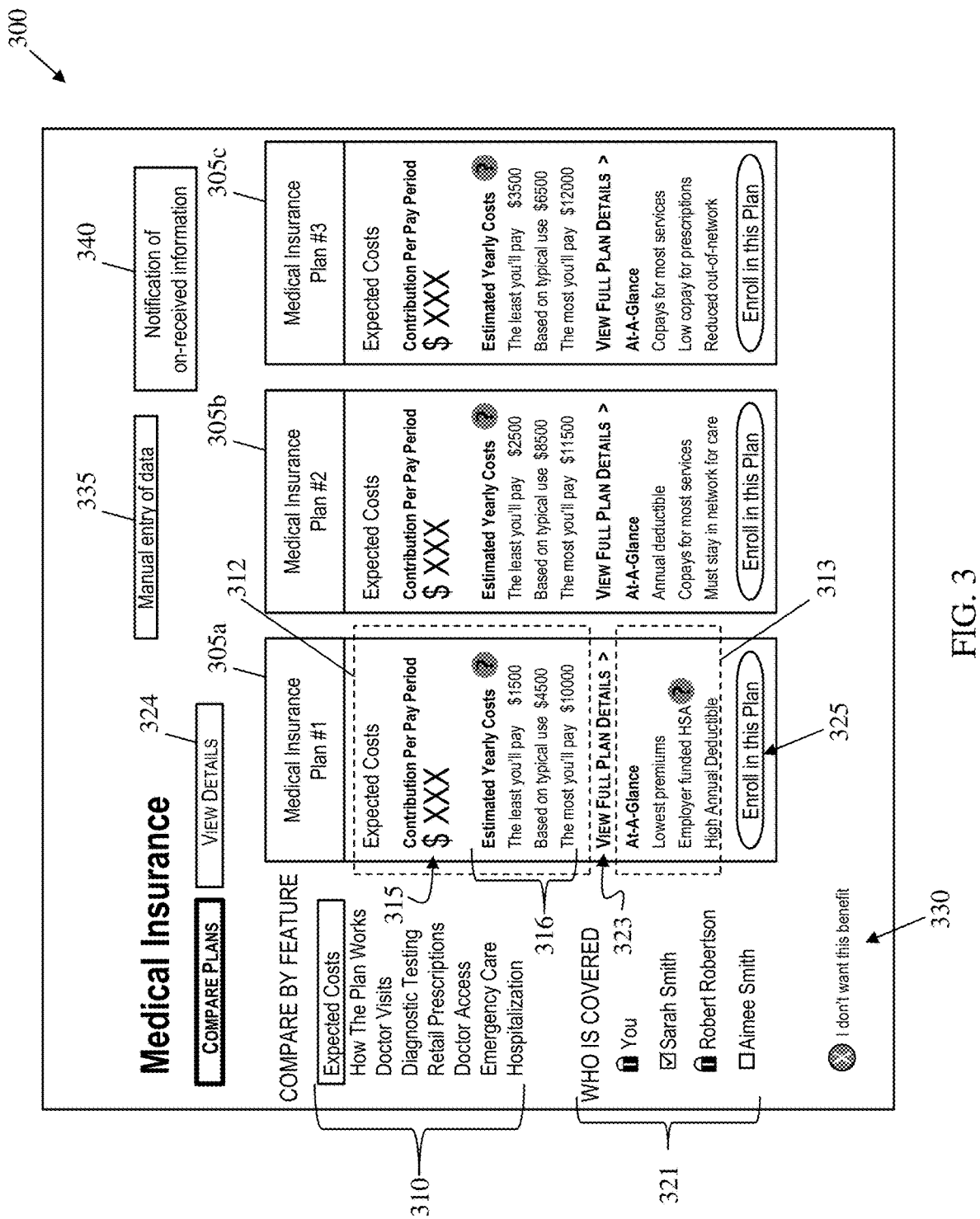

Specifically, FIG. 3 shows a plan comparison user interface (UI) 300. In accordance with aspects of the invention, the comparison UI 300 simultaneously displays information for plural different insurance plans obtained from different external sources and collated into a single, standardized format for comparison purposes. Also, the information can be normalized, when required. For example, systems and processes of the present invention can take disparate information and normalize such data for comparison purposes. By way of illustration, the systems and processes of the present invention can convert a cost per paycheck amount for a contribution into a dollar amount based on a monthly or bi-weekly period or other period in which a consumer would receive a paycheck. In this way it is possible to compare data that was originally provided in a disparate manner, e.g., cost per paycheck vs. annual or monthly costs.

Specifically, as shown in FIG. 3, the comparison UI 300 includes respective areas 305a-c (also referred to as "tombstones") that display information of each respective medical insurance plans obtained from various external sources. For example, area 305a displays information associated with plan #1, area 305b displays information associated with plan #2, and area 305c displays information associated with plan #3. In embodiments, each of these plans can be a medical insurance plan obtained from different external sources, which have different information, formats, etc., and which can be collated and provided in a standardized form. This information received from the different external sources can be stored in a single database such as the storage system 120 of FIG. 1. It should be understood by those of skill in the art that although three plans are shown in UI 300, any number of plans and associated costs and other information are contemplated by the present invention.

As shown further in FIG. 3, the comparison UI 300 includes a list 310 of topics (e.g., features of predefined categories) that are individually selectable by the consumer and that define what information is presented in the areas 305a-c. For example, the list 310 of topics include the following information obtained from different sources and which are collated and provided in a standard form (and normalized, if necessary, etc.) for comparison: Expected Costs, How The Plan Works, Doctor Visits, Diagnostic Testing, Retail Prescriptions, Doctor Access, Emergency Care, and Hospitalization; although, it should be understood by those of skill in the art that the list 310 can include any number and types of topics. The different information to obtain/retrieve/import can be determined by a look-up table.

In embodiments, information for each of the topics is first obtained by the systems and processes of the present invention, as described herein, and then provided in a standardized format so that it is possible to make a side-by-side comparison of the different medical insurance plans obtained from the different external sources (which may include different types of information). That is, as to the latter point, the systems and processes of the present invention will standardize the information from different sources by, e.g., transforming similar data received in various formats and from various external sources into a common format which enhances the comparison process. For example, the present invention can parse a doctor's name commonly containing either a "Dr." at the beginning of the name or "MD" at the end of the name, into a common format, e.g., Dr., and then place the doctor's name for each plan into the areas 305a-c in order to speed up the comparison process. This same or similar process can be used for different information in order to allow an analysis o same type of information in a standard form for ease of understanding and comparison.

In FIG. 3, the consumer has selected the topic "Expected Costs" (as indicated by the highlighted appearance of the text), which causes the system to generate the comparison UI 300 such that area 305a displays information regarding the expected costs of plan #1, area 305b displays information regarding the expected costs of plan #2, and area 305b displays information regarding the expected costs of plan #3, any of which were originally obtained from different external sources associated with the different medical insurance plans. As shown in this UI 300, each of the areas provide common information in a normalized data set for display in a standardized format, e.g., yearly costs, monthly costs, etc., so that the consumer can easily compare the expected costs (or other information) of the different plans, obtained from different external sources.

Figure 4:
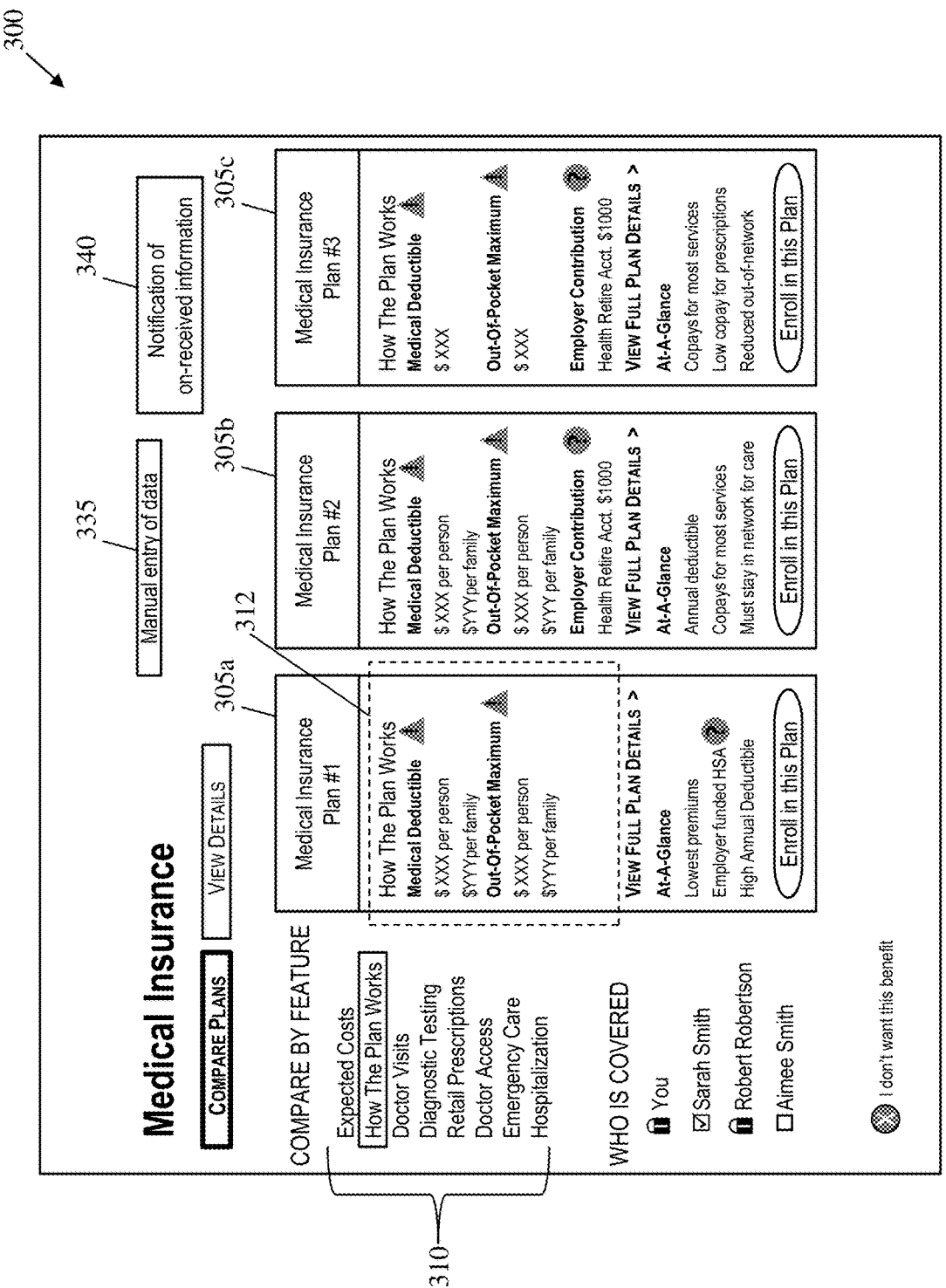
Figure 5:
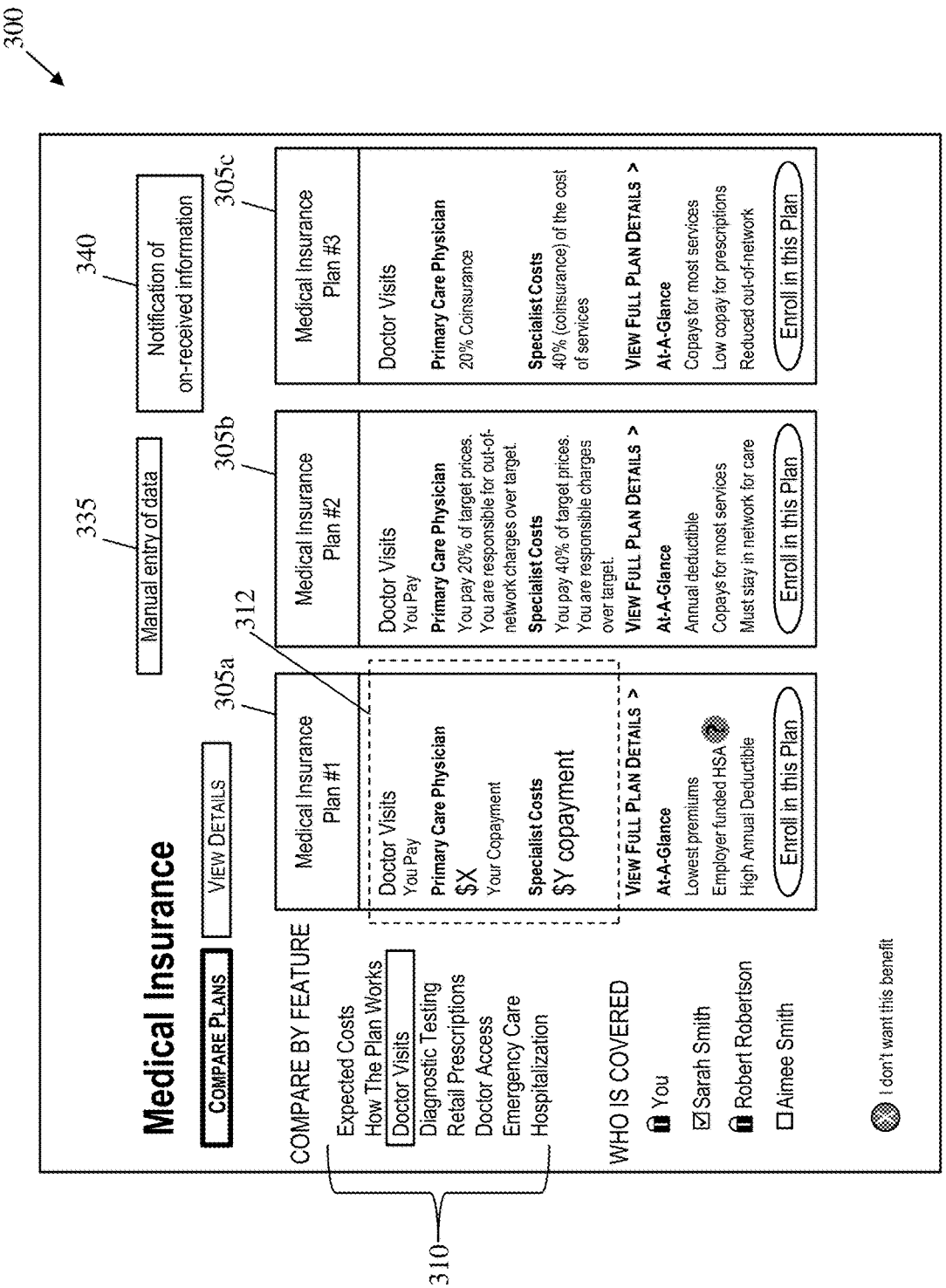

By selecting a different one of the topics in the list 310, the consumer may cause the system to change what information is displayed in each of the areas 305a-c, as described in greater detail herein with respect to FIGS. 4 and 5. For example, starting at the comparison UI 300 as shown in FIG. 3, the consumer may select the topic "How the Plan Works" in the list 310 to cause the comparison UI 300 to change from that shown in FIG. 3 to that shown in FIG. 4.

In embodiments, each of the areas 305a-c includes a dynamic area indicated by dashed line box 312 that is changeable based on consumer selection, and a static area indicated by dashed line 313. For example, the information that is associated with the selected topic from the list 310 is displayed in the dynamic area 312, such that the information displayed in the dynamic area 312 changes based on consumer selection applied for the list 310. Specifically, in the example shown in FIG. 3, the consumer has selected "Expected Costs" in the list 310, which causes the systems and processes to generate the comparison UI 300 such that the dynamic area 312 of each of the areas 305a-c displays expected costs information for each of the respective plans, in a common format for ease of comparison.

On the other hand, information in the static area 313 remains the same regardless of which topic of the list 310 is selected by the consumer. In the example shown in FIG. 3, the static area 313 is populated with "At-A-Glance" information for each respective plan, although any desired information may be displayed in the static area 313. In embodiments, the "At-A-Glance" information can include different bullet points of information about each of the plans based on such factors as, e.g., lowest premiums, employee funded health savings accounts (HSA), no cost preventative care, high annual deductibles, etc. Again, though, the static information will include information which is standardized amongst the different plans in order to facilitate the comparison process by the consumer.

As shown further in FIG. 3, for each of the different plans at areas 305a-c, an expected contribution per pay period is shown at reference numeral 315. The expected contribution per pay period 315 can be based on a total yearly cost of the medical insurance divided by the number of paychecks the consumer may receive in any given year. Of course, it should be understood by those of skill in the art that the contribution per paycheck can vary depending on the number of paychecks per year, the typical usage, as well as other factors such as individual usage scenarios and benefits received from the employer or different types of insurance plans which are not offered by the employee and which cannot be deducted from a paycheck. It should also be understood by those of skill in the art that the expected contribution per pay period 315 can be representative of a dollar amount in which the consumer will pay at predefined periods e.g., month. So, for example, if an employee/consumer is not receiving any benefits from an employer and/or the plan is not an employer sponsored plan such that it cannot be paid directly from a paycheck, the estimated contribution per pay period 315 can be representative of a monthly cost of the insurance plan, which is directly comparable to an estimated cost per paycheck. In this way, the consumer is provided with a side by side comparison of the costs for the same predefined period, whether the costs are deducted from a paycheck or paid directly to the plan administrator by the consumer.

It should be understood by those of skill in the art that information of plan #1 may have been originally obtained as a dollar amount for a paycheck; whereas, information of plan #2 may have been originally obtained as a dollar amount based on a monthly premium or yearly amount. A similar situation can also occur with other information, wherein the related data from different insurance plans are obtained in different forms, varieties or kind, as examples. Accordingly, the systems and processes of the present invention can normalize this data through analysis and adjustment into a common "denominator", thus providing same types of information, e.g., costs, in a same manner. This allows the information to be easily compared amongst different medical insurance plans. To do so, from a technological standpoint, the comparison tool:

(i) determines which information is relevant and accordingly, which information needs to be obtained;

(ii) determines what information type was obtained from the different sources, e.g., costs, plan benefits, etc.;

(iii) maps the information of the different sources into common fields or batches of pre-defined categories (which includes saving the information in a database, e.g., storage system 120);

(iv) determines the common denominator for the information in the common fields (pre-defined categories), which may be a least common denominator;

(v) converts (normalize) the information for each of the pre-defined categories using the common denominator so that all of the information in the common fields are provided in a single or common manner, e.g., yearly costs, costs per paycheck, types of medical plans (HMO, PPO), etc.; and (vi) presents the information in the common, normalized form, into a standard format, by mapping the common, normalized data to a particular field in the common format. This latter feature may include, e.g., creating the visual display of a plurality of selectable and dynamically changeable areas 305a-c, each of which is associated with a pre-defined category of a different plan and which is populated with the normalized imported plan information in a standard format for side-by-side comparison as shown in any of the FIGS. 3-8, for example.

FIG. 3 also shows the total yearly cost of each insurance plan represented by the "least you'll pay" line item shown in reference numeral 316. So, for the example of medical plan #1, an employee receiving 12 paychecks per year would have an estimated contribution per pay period 315 in the amount of $125 (represented as "XXX"), based on a least amount paid of $1,500 (represented as "YYY") as shown at reference numeral 316. Similarly, if the employee/consumer is not receiving any benefits from an employer and/or the plan is not an employer sponsored plan such that it cannot be paid directly from a paycheck, the "least you'll pay" line item shown in reference numeral 316 can be representative of a cost of the insurance plan, which is directly comparable to an estimated cost per paycheck, i.e., normalized data.

In embodiments, the systems and processes determine the expected costs for each plan based on predefined data for each plan obtained from the external sources. For example, the baseline yearly cost for different levels of coverage of each plan (e.g., self, self and spouse, self and child, family, etc.) may be stored and accessed and used by the systems and processes to determine expected costs that are displayed in areas 315 and 316. Additional data may be stored and used to determine "typical use" cost estimates for each plan.

Still referring to FIG. 3, the comparison UI 300 also includes a total estimated yearly cost of the medical plan. In embodiments, the estimated yearly cost is based on factors, including demographic information. These different costs can be, e.g., least amount of usage, typical amount usage and most amount of usage, shown generally at reference numeral 316. Regardless of what the estimated yearly cost of the medical plan is based upon, though, each of the areas 305a-c will provide a side-by-side comparison of like costs based on the same factors, e.g., time period and usage of same data calculations, so that the consumer can make an equal comparison of each of the costs. As further described herein, the typical amount of usage can be adjusted based on consumer provided information which, in turn, will automatically update the expected cost for contribution per pay period at reference numeral 315.

To assist the consumer in comparing costs of each plan, the comparison UI 300 may include a "who is covered" area 321 in which the consumer may select which persons are covered by the plan. In accordance with aspects of the invention, the estimated contribution per pay period 315 and estimated costs 316 are determined based on which persons are selected in the area 321. For example, adding coverage for a spouse and/or child may change the plan from a single plan to a self-and-spouse plan or a family plan, which changes the baseline yearly cost of the medical insurance for all of the different plans obtained from different external sources and displayed in the UI 300. Accordingly, when the consumer selects or de-selects a name in the "who is covered" area 321, the system each process recalculate the costs for each plan (based on the selected persons at area 321) and changes the display of the estimated contribution per defined period 315 and estimated costs 316 in each of the areas 305a-c.

This is demonstrated in FIG. 6, in which the consumer has selected "Aimee Smith" in the "who is covered" area 321, which results in the estimated contribution per defined period 315 and estimated costs 316 of FIG. 6 being different than the values shown in FIG. 3. In this manner, the consumer may perform "what if" scenarios by adding and/or subtracting persons from coverage to see how it affects the costs of each of the many different plans obtained from the different external sources and which can then be provided in a standardized format (with normalized data). This provides a technological advantage of permitting the consumer to simultaneously view expected costs (or other information obtained and normalized by the systems and processes herein) of plural different plans on a single screen in a normalized manner to provide the technical solutions and advantages described herein, and permitting the consumer to provide a change to who is covered that causes a recalculation and redisplay of the expected costs of each of the different plans on the same screen.

With continued reference to FIG. 3, each of the areas 305a-c may include a "view full plan details" selectable object 323 that the consumer may select to view more details of the particular plan. In embodiments, when the consumer selects the selectable object 323 in a particular one of the areas 305a-c, the system navigates the consumer to a "details" UI that displays more information about the selected plan. For example, selecting the selectable object 323 navigates the consumer directly to details of plan #2. In any of the different medical insurance plans, the systems and processes will provide the same information in the same format, as normalized data, for ease of understanding and comparison by the consumer.

The comparison UI 300 may also include a "view details" selectable object 324 that the consumer may select to navigate to the details UI to view more details of the plans. In embodiments, when the consumer selects the view details selectable object 324, the system navigates the consumer directly to details of a selected plan in another UI similar to that described above with respect to selectable object 323. Selecting the view details selectable object 324 navigates the consumer to the details UI using a default plan (e.g., the first plan) as the starting point at the details UI. This is in contrast to selecting the selectable object 323 in one of the areas 305a-c, which navigates the consumer to the details UI using the particular selected plan as the starting point at the details UI (i.e., selecting the selectable object 323 in area 305c takes the consumer to the details UI with plan #3 as the starting pint at the details UI). In this manner, the comparison UI 300 simultaneously provides two different links to navigate to the details UI: a first link to navigate directly to a particular plan in the details UI by selecting the selectable object 323 in a particular area 305a-c; and a second link to navigate to a default view of the details UI by selecting the selectable object 324.

To assist in the enrollment process each of the areas 305a-c may include an "Enroll in this Plan" selectable object 325 that the consumer may select to enroll in the particular plan. In embodiments, when the consumer selects the selectable object 325 in one of the areas 305a-c, the system navigates the consumer to a confirmation screen that displays the name of the selected plan and prompts the consumer to positively confirm (e.g., with an additional input) their selection of this particular plan. For example, the consumer selecting the selectable object 325 in area 305c causes the system to navigate the consumer to a confirmation screen for confirming their selection of plan #3.

Still referring to FIG. 3, the comparison UI 300 may also include an "I don't want this benefit" selectable object 330 that the consumer may select to indicate voluntary waiver of this benefit. In the example of medical insurance, the consumer may already be covered by another person's plan, and thus may wish to waive their own purchase of medical insurance. In embodiments, when the consumer selects the selectable object 330, the system navigates the consumer to a confirmation screen that prompts the consumer to positively confirm (e.g., with an additional input) their election to waive this benefit.

The comparison UI 300 also provides the consumer or administrator with the ability to manually add information about the particular medical plans including, for example, a days left to enroll, costs, type of network (e.g., HMO, PPO, etc.), particular types of benefits or costs, or other information in which the consumer would like to make a comparison amongst different medical insurance plans, at reference numeral 335. For example, the days left to enroll can be based on an open enrollment period and, more specifically, the number of days left in an open enrollment period for each of the medical insurance plans. By manually entering any of this information, the systems and processes of the present invention will automatically include such information (which could not automatically be obtained) in the areas 305a-c, for comparison between the different medical insurance plans, inside or outside of an employer sponsored group of plans.

The comparison UI 300 also provides the consumer or administrator a notification that certain information was not retrieved for comparison, at reference numeral 340. For example, the notification 340 can alert the consumer or administrator that costs associated with certain events, e.g., a doctor's office visit, different brand and generic prescriptions, diagnostic testing, emergency room visits, etc., was not obtained for certain medical insurance plans. In addition, this notification can be for other information, which was not retained but which was determined to be required, including type of plan (HMO, PPO, etc), types of coverage obtainable with a certain medical insurance plan, etc. As already described herein, the systems and processes of the present invention can attempt to obtain/import this information from other sources, or allow the consumer or administrator to manually enter such information, so that it can be placed in a standardized format (and normalized, if necessary) for ease of comparison as shown, e.g., in FIGS. 3-8.

FIG. 4 shows the comparison UI 300 after the consumer has selected the topic "How The Plan Works" in the list 310. As described with respect to FIG. 3, selecting a different topic in the list 310 causes the system to change what information is displayed in each of the areas 305a-c. For example, selecting the "How The Plan Works" topic causes the system to generate the comparison UI 300 such that the dynamic area 312 of each of the areas 305a-c displays information regarding, for example, deductibles, out-of-pocket maximums, etc. Specifically, in this example, area 305a displays information regarding the deductible and out-of-pocket maximums for plan #1, area 305b displays this information for plan #2, and area 305c displays this information for plan #3, each of which was obtained from an external source and normalized and/or standardized by the systems and processes of the present invention. The particular information that is displayed in each area 305a-c may be stored in a database and retrieved by the computer system when the consumer selects one of the topics in the list 310.

FIG. 5 shows the comparison UI 300 after the consumer has selected the topic "Doctor Visits" in the list 310. In this example, this selection by the consumer causes the system to generate the comparison UI 300 such that the dynamic area 312 of each of the areas 305a-c displays information regarding, for example, copay information, coinsurance information, etc., each of which was obtained from an external source and normalized and/or standardized to provide the technical solution and advantages of the systems and processes of the present invention, as with any of the information.

Thus, by selecting one of the topics of the list 310, the consumer may cause the comparison UI 300 to change the type of information that is displayed in each of the dynamically changeable and selectable areas 305a-c. As noted herein, this information was obtained from different external sources, collated, normalized (if necessary) and provided in a standardized form for viewing and side-by-side comparison by the consumer. This information can be obtained based on any desired or required information as defined by an administrator, for example, and provided in a look-up table or fields within a database and which is subsequently retrieved/obtained/imported by the systems and processes of the present invention.

This provides the technological advantage of permitting the consumer to view and compare topics (i.e., features) of the different plans simultaneously on a single screen, combined with permitting the consumer to switch from a first topic to a second topic with a single input, e.g., a mouse click or finger tap on one of the topics of the list 310 or from viewing the information in disparate formats, with disparate information on different websites or different sources of documentation.

FIG. 6 shows the comparison UI 300 after the consumer has selected another name in the "who is covered" area 321. Specifically, in the UI 300 of FIG. 6 the consumer selected "Aimee Smith" and "Sarah Smith" in the area 321, which represents a different group of people to be covered compared to the UI 300 of FIG. 3 where the consumer selected "Sarah Smith" but did not select (or de-selected) "Aimee Smith". Accordingly, the expected costs 315 and 316 displayed in areas 305a-c are different in FIG. 6 than in FIG. 3, based on a different group of people being covered.

In the user interface 700 of FIG. 7, the consumer (e.g., user) now has access to cost comparison tools, which may be used to estimate costs on a more granular basis for each of the different medical insurance plans. In embodiments, for example, the user interface 700 can include a table of sample scenarios (plan options) 705, for different plan participants to be covered by any of the offered medical plans.

As shown in FIG. 7, these sample scenarios can include different plan participants to be covered, e.g., John S., David S. and Mikey S. (although any number of plan participants can be provided on this user interface 700) by the different medical plans obtained from different sources in different formats, forms, etc., as well as a base value for a set of scenarios, which initially calculated using demographic information, e.g., age, gender, residence information, etc. for each covered person. For example, based on demographic information, the values of the different scenarios are automatically set. It should be understood that the base value can be any out-of-pocket expenses for services and/or products shown at reference numeral 705, which was obtained from external sources, collated, normalized (if necessary) and placed into a standard format.

In embodiments, the different scenarios shown in FIG. 7 include a set of base values for a typical usage scenario. These different scenarios include, by way of illustrative and non-limiting example, doctor's visits, brand Rx, generic Rx, minor surgeries, hospital stays, imaging, e.g., x-rays, etc. These base scenarios include a set of values, e.g., number, which is initially used to calculate the estimated costs for a typical usage plan, at reference numeral 715 of FIG. 7. It should be understood by those of ordinary skill in the art that the different base values were obtained from different external sources and normalized by the systems and processes of the present invention so that the consumer can make a comparison of the different costs of each of the plans. These costs, after manipulation, can then be provided on the interface (UI) shown in FIG. 3.

Based on the typical usage scenario, several cost estimates can be provided to the consumer as shown at reference numerals 710 and 715. These cost estimates can be shown in a graphical format (e.g., bar graph 710) based on contributions and out-of-pocket expenses (which costs were originally obtained from an external source and then provided in the present UI as described herein) for the typical usage plan, as well as a total dollar amount shown at reference numeral 715. In embodiments, the graphical format 710 includes the maximum dollar amount that can be expended by the consumer, based on different scenarios and values. In addition, the graphical format 710 can include other information such as, for example, employer contributions (e.g., least amount paid as shown in FIG. 3) and any amount left or originally provided in the consumer's HSA account, as well as other information. Note that the total costs per year shown at reference numeral 715 for each medical insurance plan will match the estimated typical yearly usage amount shown in FIG. 3.

In embodiments, the contributions and out-of-pocket expenses shown in FIG. 7 are based on a plan having a maximum out-of-pocket expense for a family. It should be understood by those of ordinary skill in the art, though, that the maximum out-of-pocket expenses can be based on other factors such as out-of-pocket expenses for an individual (or a combination of maximum out-of-pocket expenses for a family and an individual, depending on the selected medical plan).

In any scenario, the interface 700 of FIG. 7 is further configured to allow the consumer to estimate the out-of-pocket expenses by adjusting the values of any scenario shown at reference numeral 705. That is, by selecting the arrow icon 705a or alternatively any of the scenarios at reference numeral 705, the comparison tool allows the consumer to adjust values of the scenarios, which will then be used to calculate an updated cost estimate, as shown for example in FIG. 8.

More specifically, in FIG. 8, the interface 700 is illustrative of the functionality permitting a consumer to adjust their cost contributions, e.g., out-of-pocket expenses. For example, FIG. 7 shows the consumer selecting the arrow associated with a doctor's visit 405a (although any of the different scenarios can be selected by the consumer) in order to make adjustments to the respective value. By selecting arrow 705a, the column associated with doctor's visit will expand, showing a slide bar 705. Advantageously, the slide bar 705 allows the consumer to have a clear, tactile way to edit the information and minimize the amount of clicks needed to set any value within this column. This interface will also encourage the consumer to adjust for different values and, in real time, see the results change in relation to their actions, e.g., moving the slider to the right will tend to increase the contribution dollar amount.

Accordingly, by using the slide bar 705, the consumer can adjust the number (value) of doctor's visit for any of the covered participants. It should be understood by those of ordinary skill in the art that this same process can be used for any other scenario shown in the table 705, and that alternative methods of adjusting the number of doctor's visit for each of the covered participants is contemplated by the present invention. For example, a fillable field may be provided by the interface, which allows the consumer to enter a number (value) within the fillable field.

In any of these alternative methods, the adjustment of the number of doctor's visits (or any other scenario in table 705) will automatically result in a recalculation of the out-of-pocket expenses for each medical plan, as shown at reference numerals 710a and 715a. That is, the bar graph shown at reference numeral 710a will update (compared to the graph shown at reference numeral 710 of FIG. 7), in addition to the total contribution cost per year (or other predefined time period) amount as shown at reference numeral 715a (compared to the total contribution per year shown at reference numeral 715 of FIG. 7). The dollar amount at reference numeral 715a will automatically update as the typical yearly usage amount at reference numeral 315 of the cost estimator interface 300 of FIG. 3.

In embodiments, the recalculation can be based on the particular costs associated with each of the medical plans as obtained and imported by the systems and processes of the present invention. By way of example, if the consumer selected two additional doctor's visits per year, and the medical plan includes an out-of-pocket expense (e.g., copayment) of $50 for each additional doctor's visit, the total contribution per year amount as shown at reference numeral 715a will be updated by $100 (e.g., 2×$50/visit=$100). Similar calculations can be performed for different scenarios. For example, a minor surgery may result in an additional cost of $100 per surgery, resulting in the total contribution per year amount increasing by $100. In embodiments, this calculation is based on each particular medical plan costs, deductibles, and other cost factors associated with the particular medical plan, and which can be changed for each plan for comparison purposes.

Figure 9:
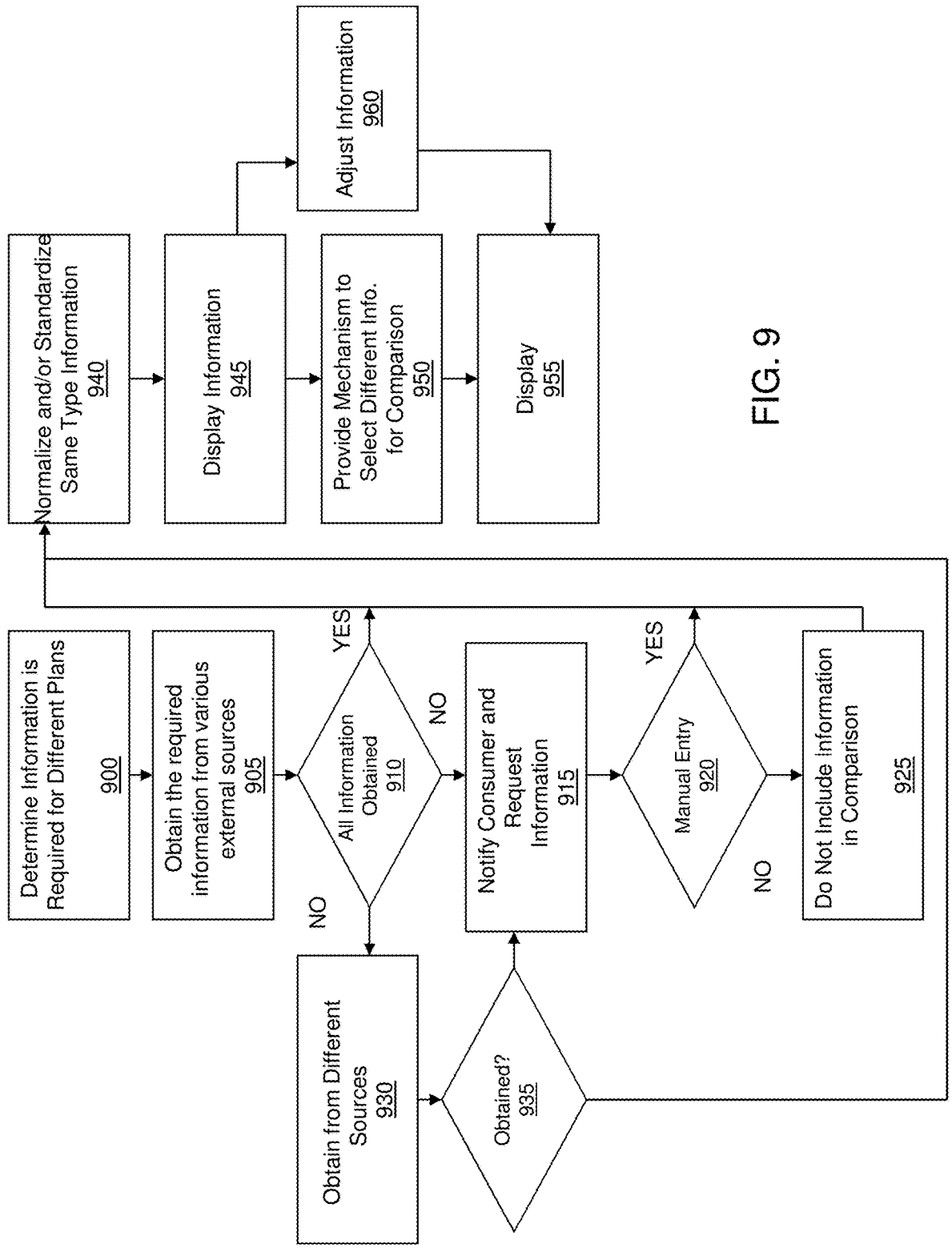
FIG. 9 depicts an exemplary flow for a process in accordance with aspects of the present invention.
Figure 10:
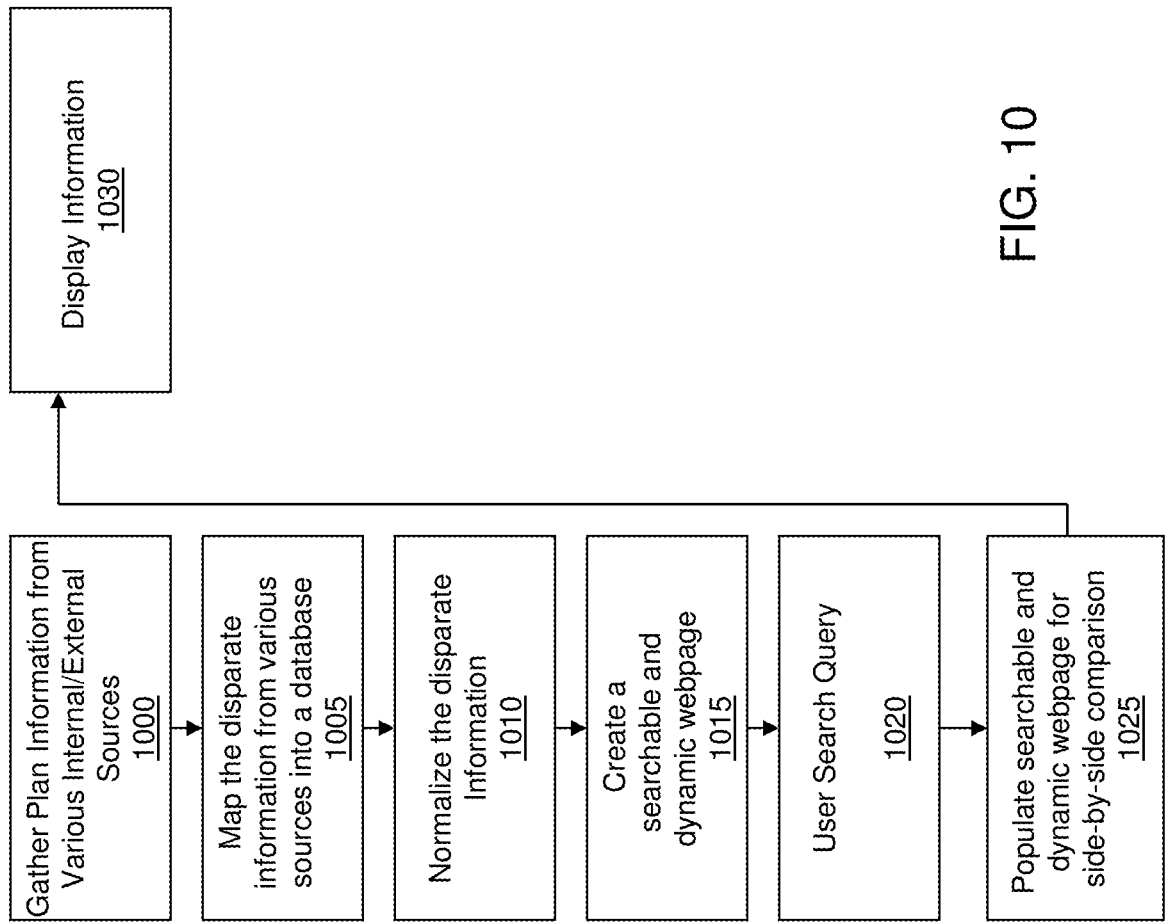
FIG. 10 depicts an exemplary flow for a process in accordance with aspects of the present invention.

FIGS. 9 and 10 depict exemplary flows for technological solutions, e.g., processes, in accordance with aspects of the present invention. The exemplary flows can be illustrative of a system, a method, and/or a computer program product and related functionality implemented on the computing system of FIG. 1, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flows of FIGS. 9 and 10 can be downloaded to respective computing/processing devices, e.g., computing system of FIG. 1 as already described herein, or implemented on a cloud infrastructure as described with regard to FIG. 2. Accordingly, the processes associated with each flow of the present invention can be implemented by special purpose hardware-based systems that perform the specified functions or acts or carry out combinations of special purpose hardware and computer instructions.

Referring to FIG. 9, at step 900, the processes of the present invention, e.g., comparison tool, will determine which information is required for comparison, from different medical insurance plans. At step 905, the processes of the present invention will obtain the required information from the different sources, as described herein. At step 910, the processes will determine whether all of the information is received. If not all of the information is obtained, at step 915, a notification can be provided to the consumer and/or administrator that all required information was not obtained. The consumer and/or administrator can then manually enter the required information at step 915. At step 920, the processes will determine whether manual entry was made. If no manual entry was made, then at step 925, the required information will not be included for comparison. In embodiments, the required information received for any of the medical insurance plans, though, may be included in the comparison, with a notation that information for other medical insurance plans for comparison was not available.

Going back to step 910, if not all of the information is obtained, at step 930, the processes can attempt to obtain the required information from different sources. If this information cannot be obtained, as determined at step 935, the processes will revert to step 915. For all of the information that is obtained, at step 940, the processes will normalize any data, as required, and provide the information in a standardized format for comparison. At step 945, the information can be displayed in a side-by-side comparison.

At step 950, the processes can provide a mechanism to select different information for comparison. This includes providing a list of features for comparison, as described herein. This new list of information can then be displayed at step 955 in a side-by-side comparison. In addition, at step 960, the processes can provide a mechanism to adjust information, e.g., base values, so that different cost calculations can be provided for display by the consumer at step 955.

Referring to FIG. 10, at step 1000, the systems and processes of the present invention gather information from both internal and external sources. The internal sources can be, for example, an employer's database which provides information about medical plans offered by the employer. The external sources can be, for example, a database of a spouse's employer, which provides information about medical plans offered by the spouses' employer, as well as government run exchanges, pension or other retirement plans and/or directly from web pages of an insurance company or insurance broker or other electronic sources.

In embodiments, the gathering of the information is provided by many different technological solutions such as (i) web scraping or other known data mining techniques, (ii) using APIs (provided by the different websites or databases), e.g., JSON, or (iii) using login information, e.g., ID and password information for different websites and/or databases. The systems and methods also contemplate the use of a web crawler or web spider, which is an Internet bot that systematically browses the World Wide Web, typically for the purpose of obtaining data for indexing.

In embodiments, an administrator can define which information is gathered by the processes and systems of the present invention. For example, the administrator can define specific medical plan information such as costs, doctor participation, types of benefits, etc. With such required definitions, which can be provided in a look-up table, it is possible for the systems and processes to gather all relevant information. Also, it is contemplated by the present invention that if not all information is gathered automatically, through the many technological solutions presented herein, an administrator or other user can manually enter data for different medical plans, using standard templates and fillable fields.

At step 1005, the systems and processes map the obtained information into a database such as, for example, a SQL database. As should be understood by those of skill in the art, SQL (Structured Query Language) is a special-purpose programming language designed for managing data held in a relational database management system (RDBMS), or for stream processing in a relational data stream management system (RDSMS). More specifically, the data mapping should be understood to be the process of creating data element mappings between two distinct data models or disparate information. Data mapping is used as a first step for a wide variety of tasks including, e.g., (i) transformation or data between a data source and a destination, (ii) identification of data relationships, and (iii) consolidation of multiple databases into a single database and identifying redundant columns of data for consolidation or elimination. Accordingly, in embodiments, the mapping provides the information into common fields or batches of pre-defined categories (which includes saving the information in a database, e.g., storage system 120).

At step 1010, the information can be standardized or normalized such that all of the information can be presented in a common format. For example, the data can be presented in a standardized format across different medical plans, from different sources, as described herein. This enables the user to easily compare different plans. More specifically, the processes and systems convert (normalize) the information so that all of the information in the pre-defined categories are in common fields and in single or common format, e.g., yearly costs, costs per paycheck, types of medical plans (HMO, PPO), etc.

At step 1015, a searchable and dynamic interface can be created by a service provider. This searchable and dynamic interface can include fields of common information, e.g., predefined categories, for side-by-side comparisons. These fields can be populated at step 1025 with normalized information from the created database, and which was specifically requested from a user at step 1020. The requested information can then be displayed at step 1030, in a common, standard format, by mapping the common, normalized information to a particular field in the searchable and dynamic interface. This latter feature may include, e.g., creating the visual display of a plurality of selectable and dynamically changeable areas 305a-c, each of which is associated with a pre-defined category of a different plan and which is populated with the normalized imported plan information in a standard format for side-by-side comparison as shown in any of the FIGS. 3-8, for example.

The service provider or other third party vendor can provide the services of the present invention based on, for example, a subscription business model. To this end, the service provider and/or third party vendor can create, maintain, support, etc., a computer infrastructure, such as computing system 100 (FIG. 1) that is configured to provide a service such as a comparison of different medical insurance plans obtained from different external sources. In return, the service provider can receive payment from the client(s) under a subscription agreement such as a subscription price paid to have access to the computer infrastructure and/or service.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of comparing plan benefits from different disparate sources, implemented in a computing system and comprising:
    searching and obtaining plan information related to pre-defined categories for different plans obtainable from different databases, web pages and other electronic sources, including scraping at least one database or website;
    comparing, for each plan of the different plans, the obtained plan information to a source indicating required information to determine whether or not the required information has been obtained by the scraping of the at least one database or website;
    in response to determining that the required information has not been obtained by the scraping of the at least one database or website, for each plan of the different plans, notifying a user of information that has not been obtained;
    normalizing the obtained plan information, including information scraped from the at least one database or website, into a common form for each of the pre-defined categories obtained from the different databases, web pages and other electronic sources;
    generating a user interface comprised of a collection of user interfaces in order to simultaneously display different features of the obtained plan information for the different plans across the collection of user interfaces, the user interface comprising a plurality of selectable and dynamically changeable areas provided in a standard side-by-side format by collating different formats of the obtained plan information from the different databases, web pages and other electronic sources into the standard side-by-side format for comparison purposes between the different features of the obtained plan information, each selectable and dynamically changeable area is associated with one or more selected categories for each selected plan; and
    populating predefined fields of each of the plurality of selectable and dynamically changeable areas with the normalized plan information associated with the one or more selected categories.

2. The method of claim 1, wherein the searching is one of Internet scraping processes, a direct web page or database login processes and application programming interface processes.

3. The method of claim 1, further comprising determining which plan information is required and associated with the pre-defined categories.

4. The method of claim 3, further comprising determining whether all of the required plan information is obtained.

5. The method of claim 4, further comprising determining what information type was obtained from the different databases, web pages and other electronic sources and mapping the information type into a database such that the obtained information is mapped to respective ones of the pre-defined categories.

6. The method of claim 3, further comprising sending a notification to a consumer and/or administrator that at least some of the required information was not obtained.

7. The method of claim 6, further comprising receiving manual entry of the required information which was not obtained, for subsequent normalization, when required.

8. The method of claim 3, further comprising searching for the required information at additional different sources, when at least some of the required information was not obtained.

9. The method of claim 1, further comprising dynamically changing at least one of the selectable and dynamically changeable areas to another plan option, wherein the changed at least one of the selectable and dynamically changeable areas is populated with the normalized imported plan information within the predefined fields for the another plan option in the standard side-by-side format.

10. The method of claim 1, further comprising dynamically changing regions for each of the displayed selectable and dynamically changeable areas with different normalized imported plan information for a single user selected category.

11. The method of claim 1, wherein the plurality of selectable and dynamically changeable areas include cost estimates based on a same period for each plan associated with the selectable and dynamically changeable areas.

12. The method of claim 11, wherein an initial estimate of contribution costs is provided on a launching site, which is updated with updated estimate contribution costs for each plan associated with the selectable and dynamically changeable areas, adjusting selected values by consumer in a single instance.

13. The method of claim 1, wherein the overall user interface simultaneously displays the plurality of selectable and dynamically changeable areas each of which is associated with a same type of information for same pre-defined categories but of different plan options.

14. A computer system for generating a comparison benefit user interface (UI), comprising:
    a hardware memory device that stores program instructions; and
    a hardware processor that executes the program instructions and causes the computer system to:
        obtain plan information of different plan options from different external electronic sources, including using at least one of an application programming interface (API) or JavaScript Object Notation (JSON) to obtain the plan information from the different external electronic sources;
        map the obtained plan information, including the plan information obtained using at least one of the API or the JSON, into pre-defined categories associated with the different plan options within a single database, the single database being created by identifying redundant columns of data present in multiple databases and consolidating or eliminating the identified redundant columns of data into the single database;
        compare, for each plan option of the different plan options, the obtained plan information to a source indicating required information to determine whether or not the required information has been obtained using at least one of the API or the JSON;
        in response to determining that the required information has not been obtained using at least one of the API or the JSON, for each plan option of the different plan options, notify a user of information that has not been obtained;

place the plan information associated with each of the pre-defined categories into a common format;

generate a visual display comprising a side by side plurality of selectable and changeable areas each having regions which are operable to contain like kind information provided in the common format; and populate pre-defined fields each of the regions of each viewable plurality of selectable and changeable areas with same plan information in the common format in response to a user selected category.

15. The computer system of claim 14, further comprising reconfiguring the regions of each viewable plurality of selectable and changeable areas with other plan information of a same type in the common format in response to the user selecting another category.

16. The computer system of claim 14, further comprising generating different viewable selectable and changeable areas with the same plan information in the common format.

17. The computer system of claim 14, wherein the placing comprises normalizing the plan information into the common format.

18. The computer system of claim 14, wherein the populating is provided in a standard format for each of the selected categories.

19. The computer system of claim 14, wherein the obtaining comprises at least one of: scraping processes, direct log in processes and by use of application programming interface processes.

20. A computer program product comprising computer readable program instructions stored on computer readable storage medium, the computer readable program instructions causing a computing device to:

import plan information of different plan options from different external electronic sources, into a single computing system;

map the imported plan information into a plurality of predefined categories associated with the different plan options within a single database of the single computing system, the single database being created by identifying redundant columns of data present in multiple databases and consolidating or eliminating the identified redundant columns of data;

compare, for each plan option of the different plan options, the imported plan information to a source indicating required information to determine whether or not the required information has been imported;

in response to determining that the required information has not been imported, for each plan option of the different plan options, notify a user of information that has not been obtained;

normalize the imported plan information into same type formats in each of the plurality of predefined categories;

generate a user interface comprised of a collection of user interfaces in order to simultaneously display different features of the imported plan information for the different plan options across the collection of user interfaces, the user interface comprising a plurality of selectable and changeable areas provided in a standard side-by-side format by collating different formats of the imported plan information from the different external sources into the standard side-by-side format for comparison purposes between the different features of the imported plan information, each of the selectable and changeable areas have dynamically changeable regions which are populated with the normalized imported plan information in a standard format for selected predefined categories of the plurality of predefined categories; and regenerate any of the viewable plurality of selectable and changeable areas or regions thereof, each of which are populated with the normalized imported plan information in the standard format based on a user selected predefined category.

21. The method of claim 1, wherein the scraping the at least one database or website includes scraping at least one of an insurance company website or a government exchange website.

22. The method of claim 1, further comprising, in response to determining that the required information has not been obtained, attempting to obtain the required information that has not been obtained from another location.

23. The computer system according to claim 14, wherein the obtaining the plan information using at least one of the API or the JSON comprises using at least one of the API or the JSON to obtain the plan information from at least one of an insurance company, a government exchange, or an employer.

* * * * *